Sept. 6, 1960 C. V. TILDEN 2,951,683
CORE DRILL
Filed July 16, 1957

CARL V. TILDEN
INVENTOR.

BY
ATTORNEY

2,951,683

CORE DRILL

Carl V. Tilden, Capistrano Beach, Calif., assignor to Village of Deming, N. Mex., a municipal corporation Filed July 16, 1957, Ser. No. 672,232

12 Claims. (Cl. 255—72)

This invention relates to cutting tools and more particularly to an improved core drill provided with adjustable, reversible and replaceable cutting elements.

Cutting tools of the drill type designed for use with materials difficult to cut have customarily been designed with fixed and permanently assembled cutting elements, the elements being brazed, soldered or otherwise secured to the advance end of the drill. Since the cutting element usually has only a small portion exposed beyond the body of the drill, it is quickly dulled and repeated sharpening is required.

Attempts to provide tools with adjustable mountings for the cutting elements have been made but have not been very successful. Moreover, such adjustable cutters require frequent resurfacing of the cutter edges. Certain proposals have been made for using roller cutting elements wherein only a portion of the roller rim is in use at any given time for cutting, thereby making it feasible to restore the original cutting effectiveness by rotating the roller to bring an unused portion of the cutter into operation. Although prior constructions having such capabilities have represented an improvement over earlier designs, still they have been subject to the disadvantage of relying upon undesirable mounting and clamping expedients. Additionally, the mounting heretofore provided for the roller cutters were not suitable for use in the smaller size cutting tools and have lacked a simple and effective means for assuring uniform adjustment of all cutters during both initial assembly and subsequent adjustment operations.

The present invention obviates the serious shortcomings of prior designs and provides an unusually simple cutting tool having readily adjustable cutters. These comprise identical cutter discs arranged to be loosely journalled in specially designed seating recesses each arranged to be detachably held in place by a single headed pin frictionally retained in a tapering bore.

Accordingly, it is a primary object of the invention to provide an improved cutting tool having readily adjustable, reversible and replaceable roller cutting elements.

Another object of the invention is the provision of a cutting tool employing identical discs as the cutting elements each loosely journalled on a one-piece mounting element adapted to be frictionally assembled to the cutting head of the drill.

Another object of the invention is the provision of a cutting tool employing adjustable and replaceable cutting discs rigidly supported in identical operating positions with one end face and a portion of one rimmed edge frictionally restrained against the juxtaposed seating faces of receiving recesses formed in the advance end of the tool body, the cutters being held so seated so long as cutting pressure is applied to the tool and being free to assume a different adjusted position when drilling pressure is removed.

Another object of the invention is the provision of a core drill having cutting elements of disc shape formed of special cutting material and adapted to have cutting effectiveness fully restored by reversal of the cutting disc to present the opposite rim edge in cutting position, together with simple, compact, inexpensive and easily operated supporting means for facilitating such reversal of the cutters.

Another object of the invention is the provision of a core drill having a cylindrical main body provided with a detachable cutting head frictionally held in assembled position to one end of the drill body and having loosely-supported readily-detachable and reversible cutting elements supported in recesses formed in the advance edge of the head.

Further objects and advantages of the invention will become apparent from the following description taken in connection with the accompanying claims and from the annexed drawing wherein:

Figure 1:
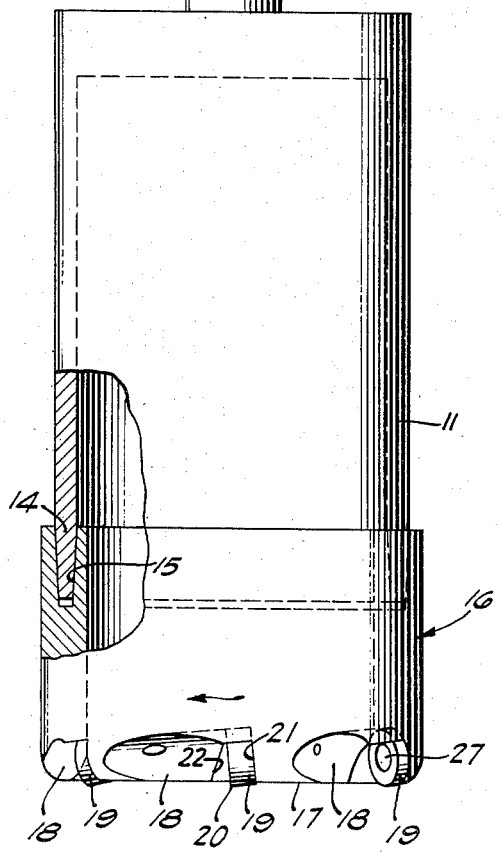
Figure 1 is a side view of a core drill incorporating the present invention, a portion of the side wall being broken away to show details of the friction coupling.

Referring to Figure 1 there is shown a drill tool 10 having a tubular main body 11 provided at one end with a driving shank 12. The upper end of shank 12 is preferably provided with a Morse taper as indicated at 13 to fit frictionally within a complementary driving socket of a rotating power source, not shown. The opposite end of body 11 is preferably similarly tapered to fit within a complementarily shaped groove 15 in one end edge of an annular drill head ring 16. It will be understood that the radial thickness of ring 16 is somewhat greater than that of tubular body 11 with its inner and outer side walls projecting slightly beyond the corresponding surfaces of the main body thereby avoiding power losses by frictional contact of the drill walls with the side walls of the hole being drilled.

Figure 2:
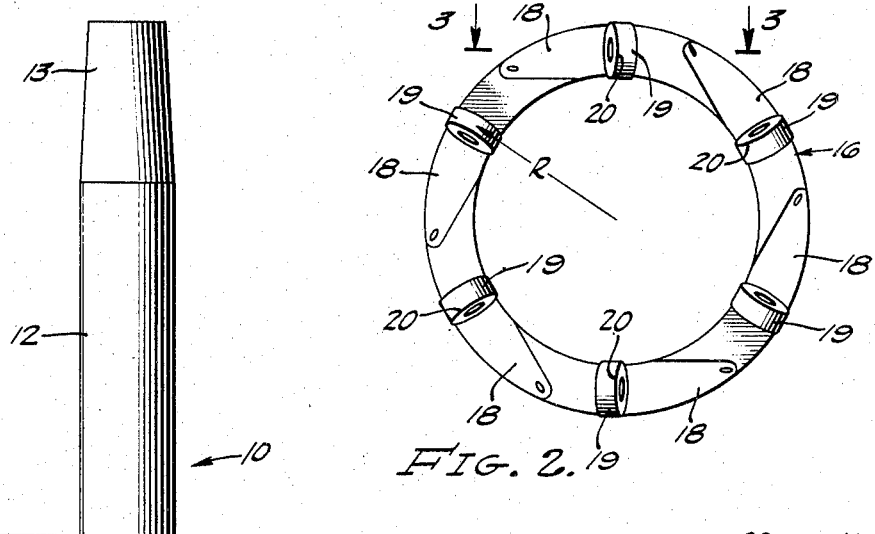
Figure 2 is an end view of the cutting head.

The cutting elements and their mode of support constituting important features of the invention will be described by reference to Figures 1 to 4. As is best shown in Figures 1 and 2, the outer end 17 of the cutting head is rounded on a radius equal to half the thickness of ring 16 and is provided in its advance rim edge with a plurality of circumferentially spaced recesses 18 having a diameter corresponding to the diameter of the disc cutter elements 19 to the end that the cylindrical peripheries of the cutting elements may seat firmly against the side walls of these recesses while drilling pressure is applied to the drill. As is indicated by the drawings and particularly by Figure 3, the axis of each recess 18 is inclined at a slight angle with respect to a transverse plane normal to the axis of the cutting head with its inner end substantially tangential to a circle of a radius R.

Figure 3:
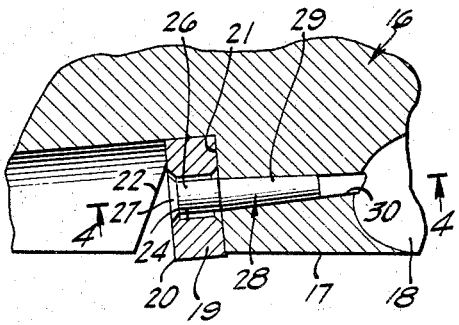
Figure 3 is an enlarged fragmentary view taken on line 3—3 of Figure 2.
Figure 4:
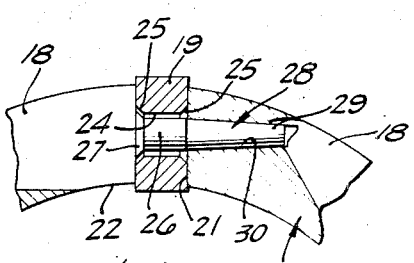
Figure 4 is a view similar to Figure 3 but taken along line 4—4 on Figure 3.

The flat end wall 21 of the recesses lies parallel to radial line R and normal to the axis of recesses 18. Also to be noted is the fact that the axis of the recess at the point where it intersects end face 21 lies midway between the inner and outer side walls of the cutting head with the result that the cutting elements 19 of slightly greater diameter have diametrically opposed edges thereof projecting slightly beyond the inner and outer side walls of the cutting head. This assures that the cutting elements will cut an annular groove having slight clearance with both side walls of the cutting head. Additionally, the inner side wall of the head will be pierced by recess 18 along sharp edges 22 as indicated in Figures 3 and 4.

The cutter discs 19 may be formed from any suitable material highly resistant to abrasion, substantially unaffected by the heat of friction, having long-wearing qualities and capable of maintaining a sharp cutting edge under the rigorous conditions encountered in rapid drilling of hard materials. A variety of materials meeting these specifications are commercially available, particular ones being more suitable for certain purposes than others depending upon the particular material to be cut, the operating speeds involved and the pressure to be applied to the cutter element. While all suitable materials are to be considered as coming within the scope of the present invention, particularly suitable general purpose materials include tungsten carbide, cemented carbide and others. This disc has a circular hole 24 provided with chamfered edges 25, these edges as well as the hole diameter being substantially larger than the shank diameter 26 of a retaining pin 28. The latter has a flaring head 27 and a long tapered end 29 adapted to have a tight frictional fit with a tapered passage 30, the axis of which is coincident with the axis of recess 18. The small diameter end of passage 30 opens into an adjacent one of recesses 18, this opening providing access for a punch tool for dislodging the pin 28 when it is desired to reverse the position of the cutting disc 19 or to replace it with a new one. As is clearly shown in Figures 3 and 4, the tapered head 27 of pin 28 has ample clearance with chamfered edge 25 of opening 24 to permit limited free movement of the cutter on the supporting pin without, however, permitting it to become displaced to an objectionable extent.

In use it will be understood that the tapered end 13 of shank 12 is assembled in a driving chuck of a suitable power unit and that cutting head 16 is similarly fitted over the converging end 14 of the drill body. The cutting end of the drill is then pressed against material to be drilled and rotated in a direction to advance the cutting edge 20 of the several discs 19 into the material. As the drill advances a distance equivalent to one-half the diameter of cutters 19, the entire lower edge of the cutter will be effective although the major portion of the cutting action will take place along the lowermost edge. So long as axial pressure is applied to the cutting tool the cutting discs will be seated firmly against the arcuate bottom wall of recesses 18 with their concealed faces tightly seated against end face 21 of the recesses. Likewise the peripheral rims in juxtaposition to the cylindrical surfaces of recesses 18 will be pressed into firm frictional engagement therewith as is made clear by Figure 3. If drilling pressure is released and the drill is raised, cutting discs 19 will drop slightly as permitted by their loose fit on pins 28 at which times the discs are free to rotate to a different adjusted position.

In consequence, it will be recognized that the cutting discs are locked firmly against movement of any nature relative to head 16. No part of the cutting load is carried by the shank of the mounting pin 28 due to the oversize character of opening 24 and of chamfered edge 25.

Adjustment of the cutting edge to a new position is accomplished by the simple expedient of releasing the drilling pressure thereby leaving the cutting disc free to rotate on pins 28. Normally this action will take place automatically since the unworn edge will be uppermost and will tend to rotate automatically about the shank of the mounting pin following which pressure is again applied to drill, thereby frictionally locking the cutting disc firmly in its new adjusted position.

When the entire leading edge 20 of the cutter has become dull and worn the cutting effectiveness may be fully restored by pressing pins 28 from passages 30, reversing the discs on the pins and then firmly reseating the tapered shanks in passages 30. Renewal of the cutters with a new set is accomplished in the same manner. It is to be noted that the dulling of the cutting rim edge does not interfere with the frictional seating of the disc against the side wall of recesses 18 since wear is confined to the cutter edge with substantially none occuring on the midportion of the cylindrical face. Nor does any wear take place on the mounting pin which may be used over and over with repeated sets of new cutters.

While the particular rotary cutting tool herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. An elongated core drill comprising a cylindrical body having an axial driving shank at one end and a tapering rim edge at its other end adapted to form a friction driving fit with a similarly tapered mating groove in a drill head, a drill head ring assembled frictionally to the tapered end of said body, the outer end face of said drill head ring having a plurality of elongated recesses distributed circumferentially thereof having arcuate side walls and terminating in flat end faces inclined to the longitudinal axis of the drill, a tapering passage opening through the center of said flat end face, a headed mounting pin frictionally seated in said tapering passage and having a cutter disc of special cutting material loosely journalled thereon with one peripheral rim edge projecting below a plane flush with said drill head ring end and with its diametrically disposed rim face seated against the arcuate wall of said recess.

2. A core drill as defined in claim 1 wherein said tapering passages have their smaller ends opening into the next adjacent arcuate recess and adapted to receive a punch pin to dislodge said headed mounting pins to permit reversal of the cutter discs.

3. A core drill as defined in claim 1 wherein said cutter discs are cylindrical and adapted to cut with either annular rim edge depending upon which disc face is mounted in contact with the end face of said arcuate recess.

4. A core drill as defined in claim 1 wherein the longitudinal axes of said arcuate recesses lie in a plane substantially normal to a diameter of said drill head and inclined slightly outwardly away from a plane through the end face of said drill head and normal to the drill head axis.

5. A core drill as defined in claim 1 wherein said arcuate recesses have a diameter substantially greater than the radial width of said drill head and wherein the opposite rim edges of said cutter discs project slightly laterally beyond the inner and outer side walls of said drill head.

6. A core drill having a tubular body provided with a driving shank at one end and a plurality of similarly-supported normally non-rotating readily adjustable and replaceable cutter discs at its cutting head end, said cutter discs being circular and having smooth-surfaced peripheries with all portions of each end rim edge forming a circular cutting edge whereby said cutter is adapted to be reversed to present a new set of sharp cutting edges when one set becomes dulled in use, the rim edge of said drill body having recesses shaped to seat said cutters, said recesses extending crosswise of said tubular body and having end faces tilted slightly to the drill axis whereby a portion of the leading rim edges of the discs mounted with one face pressed against said end faces are exposed beyond the end of the tubular body and whereby the trailing rim edges of the discs are located at a different elevation, and means loosely supporting said cutter discs in said recesses.

7. A core drill as defined in claim 6 wherein the diameter of said cutter discs is greater than the thickness of said tubular body, and said discs being so mounted as to be effective in cutting an annular hole having side walls spaced slightly from the inner and outer walls of said drill body.

8. A core drill as defined in claim 6 wherein said cutter discs are held loosely assembled in said recesses by tapering pins frictionally seated in tapering open-ended holes adapted to receive a pin dislodging punch at their smaller ends.

9. A core drill as defined in claim 6 wherein said recesses have an arcuate side wall and a flat end wall against which the juxtaposed rim and side faces of said cutter discs are forced while cutting pressure is acting on said drill and being effective to prevent movement of said discs when cutting, said discs being free to rotate and present a different portion of the cutting edge when no drilling pressure is being applied.

10. A drilling head having a driving end and a circular cutting end, said cutting end having a plurality of arcuate recesses having their longitudinal axes disposed generally tangentially to circumferentially spaced radii of a circle coaxial with the drill head axis and terminating in flat end walls inclined to the axis of said drilling head, disc cutters of abrasion resistant material, means loosely supporting said disc cutters with one side face against said flat end walls, said cutters being held against movement in said recesses by friction between the sides and flat ends of said recesses and the juxtaposed rim and side faces of said cutters when cutting pressure is applied to said drilling head, and said cutters being free to adjust their positions relative to said head when no drilling pressure is being applied.

11. A drilling head as defined in claim 10 wherein the mounting means for the disc cutters comprises a single element for each cutter, said single element having a smooth tapering surface adapted to be frictionally locked against a complemental cooperating surface in said drilling head.

12. A core drill as defined in claim 6 wherein said cutter disc supporting means comprises a single smooth surfaced element for each disc, said mounting element being frictionally seated in a snug opening therefor provided in said tubular body.

References Cited in the file of this patent

UNITED STATES PATENTS

| | | |
|---|---|---|
| 1,779,589 | Duda | Oct. 28, 1930 |
| 2,080,116 | Dean | May 11, 1937 |
| 2,260,366 | Childs | Oct. 28, 1941 |
| 2,597,669 | Pilon et al. | May 20, 1952 |
| 2,840,348 | Tilden | June 24, 1958 |